United States Patent
Badesha et al.

(12)

(10) Patent No.: US 6,482,504 B1
(45) Date of Patent: Nov. 19, 2002

(54) TRANSFIX COMPONENT WITH LAYER HAVING POLYMER MATRIX WITH SMALL MOLECULES AND IMAGE FORMING APPARATUS WITH SAME

(75) Inventors: Santokh S. Badesha, Pittsford, NY (US); David J. Gervasi, West Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 126 days.

(21) Appl. No.: 09/703,688

(22) Filed: Oct. 31, 2000

(51) Int. Cl.⁷ .............................. B32B 27/14; B32B 3/00
(52) U.S. Cl. .................... 428/195; 428/308.4; 428/325; 428/329; 428/447; 428/473.5; 428/474.4
(58) Field of Search ................................. 428/195, 447, 428/308.4, 325, 329, 473.5, 474.4

(56) References Cited

U.S. PATENT DOCUMENTS 6,037,092 A * 3/2000 Heeks et al. ................. 430/124
6,355,352 B1 * 3/2002 Chen et al. .................. 428/421

\* cited by examiner

*Primary Examiner*—Bruce H. Hess
*Assistant Examiner*—B. Shewareged
(74) *Attorney, Agent, or Firm*—Annette L. Bade

(57) ABSTRACT

A transfix member comprising a heating member and a component film having a surface layer and a polymer matrix layer, wherein the polymer matrix layer contains a polymer and small molecules, and the polymer matrix layer is designed to allow the small molecules to diffuse through the polymer matrix to the surface layer upon the application of pressure or heat to the component film.

17 Claims, 3 Drawing Sheets

TRANSFIX COMPONENT WITH LAYER HAVING POLYMER MATRIX WITH SMALL MOLECULES AND IMAGE FORMING APPARATUS WITH SAME

CROSS REFERENCE TO RELATED APPLICATIONS

Reference is made to co-pending, commonly-assigned U.S. patent application Ser. No. 09/703,604, filed Oct. 31, 2000, entitled "Layer Having Polymer Matrix and Small Molecules," Attorney Docket No. D/A0794. The disclosure of this application is hereby incorporated by reference in its entirety.

BACKGROUND OF THE INVENTION

The present invention relates generally to layers useful in an imaging apparatus components, for use in electrostatographic, including digital, apparatuses. The layers herein are useful for many purposes including layers for transfix films or transfuse-films, and the like. More specifically, the present invention relates to-a component outer layer comprising a polymer matrix having small molecules which, upon transfer and/or fixation of a developed image, diffuse through an outer layer of the component so as to promote release of the developed image from the component outer layer. The layers of the present invention may be useful in films used in xerographic machines, especially color machines.

In a typical electrostatographic reproducing apparatus such as electrophotographic imaging system using a photoreceptor, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member can be transferred to an image receiving substrate such as paper via an intermediate transfer member. Alternatively, the developed image can be transferred to an intermediate transfer member from the image receiving member via another transfer member. The toner particles may be transferred by heat and/or pressure to an intermediate transfer member, or more commonly, the toner image particles may be electrostatically transferred to the intermediate transfer member by means of an electrical potential between the imaging member and the intermediate transfer member. After the toner has been transferred to the intermediate transfer member, it can then be transferred to the image receiving substrate, for example by contacting the substrate with the toner image on the intermediate transfer member under heat and/or pressure. Alternatively, the developed image can be transferred to another intermediate transfer member such as a transfix/transfuse or transfer member. A transfix or transfuse member uses heat associated with the transfer member in order to both transfer and fix or fuse the developed image to a copy substrate.

Intermediate transfer members, including transfix or transfuse members, enable high throughput at modest process speeds. In four-color photocopier systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing machines in which the toner image is transferred from the transfix member to the image receiving or copy substrate, it is important that the transfer of the toner particles from the transfix member to the image receiving substrate be substantially 100 percent. Less than complete transfer to the image receiving substrate results in image degradation and low resolution. Completely efficient transfer is particularly important when the imaging process involves generating full color images since undesirable color deterioration in the final colors can occur when the color images are not completely transferred from the transfer member.

Thus, it is desired that the transfix member surface have excellent release characteristics with respect to the toner particles. Conventional materials known in the art for use as transfix members often possess the strength, conformability and electrical conductivity necessary for use as transfix members, but can suffer from poor toner release characteristics, especially with respect to higher gloss image receiving substrates. When heat is associated with a transfer member, such as in the case of a transfix member, the transfix member must also possess good thermal conductivity in addition to superior release characteristics.

In addition, it is desired that the transfix member have sufficient toughness to undergo multiple cycling during use. Moreover, the outer layer of the transfix member should be chemically compatible with toner and with paper that the layer will come in contact with. In known electrophotostatographic machines, diketones are used in paper and toner components. Therefore, it is desired that the transfix outer layer be compatible with diketones and other components of toner and paper.

U.S. Pat. No. 5,361,126 discloses an imaging apparatus including a transfer member including a heater and pressure-applying roller, wherein the transfer member includes a fabric substrate and an impurity-absorbent material as a top layer. The impurity-absorbing material can include a rubber material.

U.S. Pat. No. 5,337,129 discloses an intermediate transfer component comprising a substrate and a ceramer or grafted ceramer coating comprised of integral, interpenetrating networks of haloelastomer, silicon oxide, and optionally polyorganosiloxane.

U.S. Pat. No. 5,340,679 discloses an intermediate transfer component comprised of a substrate and thereover a coating comprised of a volume grafted elastomer, which is a substantially uniform integral interpenetrating network of a hybrid composition of a fluoroelastomer and a polyorganosiloxane.

U.S. Pat. No. 5,456,987 discloses an intermediate transfer component comprising a substrate and a titamer or grafted titamer coating comprised of integral, interpenetrating networks of haloelastomer, titanium dioxide, and optionally polyorganosiloxane.

Some transfix belt configurations are composed of outer layers comprising elastomers. Release fluids have become necessary to promote release of the developed image during transfer and/or fixation of the developed image from the transfer or transfix member to the copy substrate or to another transfer member. These release fluids can contain functionality and can react with the copy substrate and components of the copy substrate, such as paper fibers of paper copy substrates. The result is gelation, which can lead to contamination. The release fluids can also react with other transfer members that they may come in contact with during transfer. The release fluids can subsequently react with other components of the subsystem, resulting in several adverse effects from the contamination of the subsystem with these oils. One possible result is an accelerated component failure due to severe contamination. This undesirable result can occur as early as several thousand prints.

Therefore, it is desired to provide a transfer or transfix member that provides for adequate release of the developed image upon transfer and/or. fixation, without the drawbacks of a release agent which may react adversely with copy substrate materials, other transfer members and subsystem members, thereby contaminating the entire system. It is also desired to provide a transfix member which has an outer layer which does not react adversely with the chemical components of paper and/or toner.

SUMMARY OF THE INVENTION

The present invention provides, in embodiments: a transfix member comprising, a) a substrate, and thereover, b) a component film having a surface layer and a polymer matrix layer comprising a polymer and small molecules, the polymer matrix layer designed to allow the small molecules to diffuse through the polymer matrix layer to the surface layer upon the application of pressure or heat to said component film, and, c) a heating component associated with said substrate.

The present invention further provides, in embodiments: a transfix member comprising, a) a substrate, and thereover, b) a component film having a surface layer and a polymer matrix layer comprising a polymer and small molecules, the polymer matrix designed to allow the small molecules to diffuse through the polymer matrix layer to the surface layer upon the application of pressure or heat to the component film, wherein the polymer comprises a functional silicone material and the small molecules comprise non-functional silicone oligomers, and, c) a heating component associated with said substrate.

In addition, the present invention provides, in embodiments: an image forming apparatus for forming images on a recording medium comprising, a) a charge-retentive surface to receive an electrostatic latent image thereon; b) a development component to apply a developer material to the charge-retentive surface to develop the electrostatic latent image to form a developed image on the. charge-retentive surface; c) a transfix component for transferring and fusing the developed image from the charge-retentive surface to a copy substrate, the transfix member comprising a component film having a surface layer and a polymer matrix layer, wherein the polymer matrix layer comprises a polymer and small molecules, the polymer matrix layer designed to allow the small molecules to diffuse through the polymer matrix layer to the surface layer upon the application of pressure or heat to the component film, and a heating component associated with the substrate.

BRIEF DESCRIPTION OF THE DRAWINGS

The above embodiments of the present invention will become apparent as the following description proceeds upon reference to the drawings, which include the following figures.

DETAILED DESCRIPTION OF THE INVENTION

The present invention is directed to component films having a surface layer, wherein the component film contains a polymer matrix with small molecules embedded or contained therein The component films can be films, sheets, belts and the like, useful in electrostatographic, including digital, apparatuses. In one embodiment of the present invention, the component film can be useful as a transfer or transfix member in an electrostatographic apparatus. The disclosure is not intended to limit the number and types of, uses for the component film disclosed herein. The use as a transfer or transfix member is an example of a preferred use of an embodiment of the film.

Figure 1:
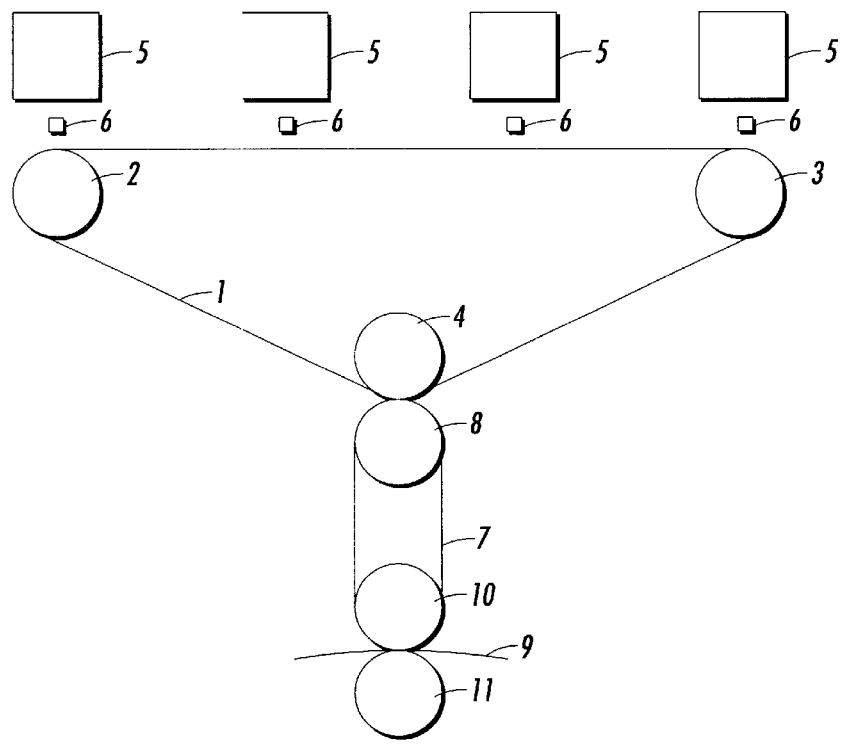
FIG. 1 is an illustration of a general electrostatographic apparatus using a transfix member.

Referring to FIG. 1, there is depicted an image-forming apparatus comprising intermediate transfer member 1 advanced by rollers 2, 3 and 4. Intermediate transfer member 1 is depicted as a belt or film member, but may be of another useful form such as a belt, sheet, film, drum, roller or the like. An image is processed and developed by image processing units 5. There may be as few as 1 processing unit, for example, for 1 color processing such as black, and as many processing units as desired. In embodiments, each processing unit processes a specific color. In preferred embodiments, there are 4 processing units for processing cyan, black, yellow and magenta. The first processing unit processes one color and transfers this developed one color image to the intermediate transfer member 1 via transfer member 6. The intermediate transfer member 1 is advanced to the next relevant processing unit 5 and the process is repeated until a fully developed image is present on the intermediate transfer member 1.

After the necessary number of images are developed by image processing members 5 and transferred to intermediate transfer member 1 via transfer members 6, the fully developed image is transferred to transfix member 7. The transfer of the developed image to transfix member 7 is assisted by rollers 4 and 8, either or both of which may be a pressure roller or a roller having heat associated therewith. In a preferred embodiment, one of roller 4 or roller 8 is a pressure member, wherein the other roller 4 or 8 is a heated roller. Heat may be applied internal or external to the roller. Heat may be supplied by any known heat source.

In a preferred embodiment, the fully developed image is subsequently transferred to a copy substrate 9 from transfix member 7. Copy substrate 9, such as paper, is passed between rollers 10 and 11, wherein the developed image is transferred and fused tithe copy substrate by transfix member 7 via rollers 10 and 11. Rollers 10 and/or 11 may or may not contain heat associated therewith. In a preferred embodiment, one of rollers 10 and 11 contains heat associated therewith in order to transfer and fuse the developed image to the copy substrate. Any form of known heat source may be associated with roller 10 and/or 11.

Figure 2:
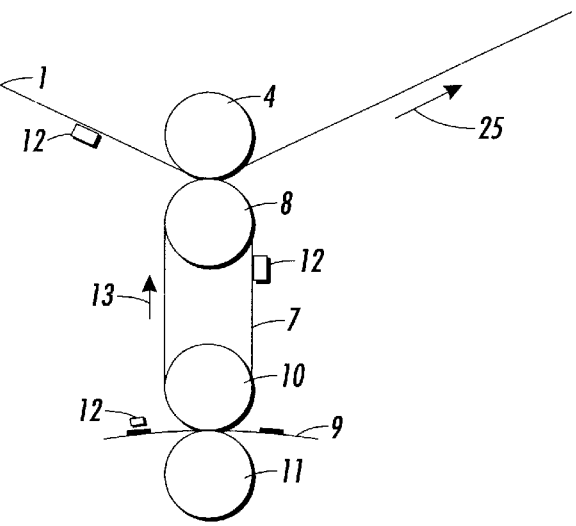
FIG. 2 is an illustration of an embodiment of a transfix system.

FIG. 2 demonstrates an enlarged view of a preferred embodiment of a transfix member 7 which may be in the form of a belt, sheet, film, roller, or like form. Intermediate transfer member 1 moves in the direction of arrow 25. The developed image 12 positioned on intermediate transfer member 1, is brought into contact with and transferred to transfix member 7 via rollers 4 and 8. As set forth above, roller 4 and/or roller 8 may or may not have heat associated therewith. Transfix member 7 proceeds in the direction of arrow 13. The developed image 12 is transferred and fused to a copy substrate 9 as copy substrate 9 is advanced between rollers 10 and 11. Rollers 10 and/or 11 may or may not have heat associated therewith.

Figure 3:
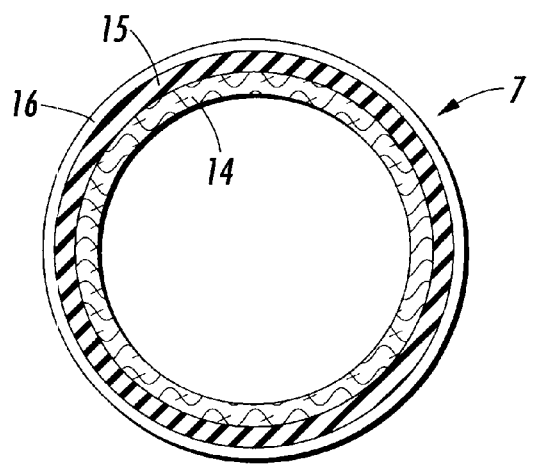
FIG. 3 is an enlarged view of an embodiment of a transfix belt configuration involving a substrate, an intermediate layer, and thin outer layer.

FIG. 3 demonstrates a preferred embodiment of the invention, wherein transfix member 7 comprises substrate 14, having thereover intermediate layer 15. Outer layer 16 is positioned on the intermediate layer 15. Substrate 14, in preferred embodiments, comprises metal or fabric. In a preferred embodiment, the substrate comprises a fabric material, the intermediate layer 15 is an elastic layer, and the outer layer 16 is a thin overcoat. In another preferred embodiment, the substrate 14 comprises a metal, the intermediate layer 15 is a thin layer, and the outer layer 16 is a thin overcoat.

Figure 4:
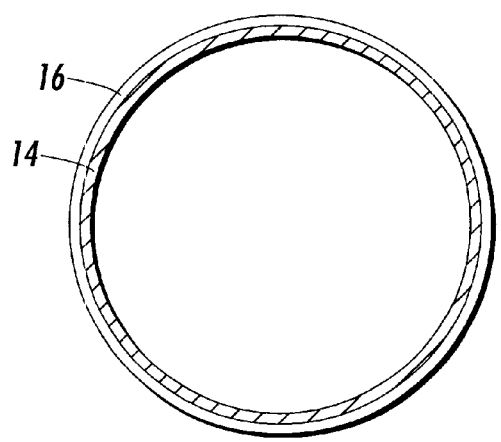
FIG. 4 is an enlarged view of an embodiment of a transfix belt configuration having a substrate and thin outer layer.

FIG. 4 depicts another preferred embodiment of the invention. FIG. 4 depicts a two-layer configuration comprising a substrate 14 and outer layer 16 positioned on the substrate 14. In a preferred embodiment, the substrate 14 comprises a metal, and positioned thereon, a thin overcoat for the outer layer 16.

Figure 5:
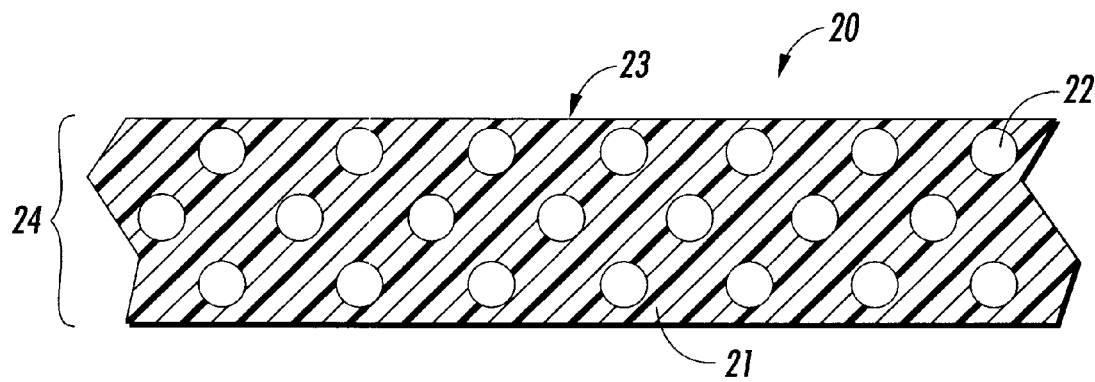
FIG. 5 is an enlarged view of an embodiment of the component film having a polymer matrix and small molecules embedded or dispersed therein.
Figure 6:
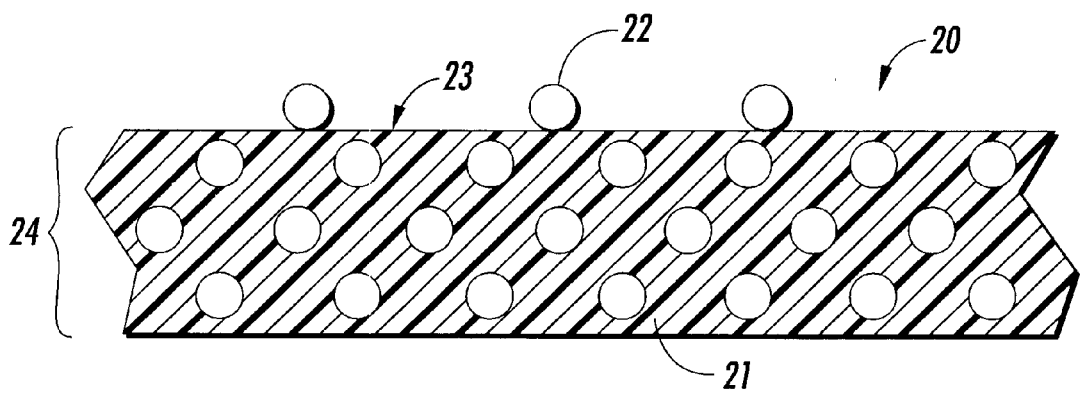
FIG. 6 is an enlarged view of an embodiment of the component film having a polymer matrix and small molecules embedded or dispersed therein, and small molecules diffusing to the surface layer of the component film.

FIGS. 5 and 6 depict an embodiment of the component film of the present invention. FIGS. 5 and 6 demonstrate a film component 20 comprising a polymer matrix 24. The polymer matrix 24 comprises a polymer 21 and small molecules 22. The polymer matrix is designed so that the small molecules 22 will diffuse through polymer 21 to the surface layer 23.

The polymer matrix can be used as an intermediate layer or outer layer of a component. It is preferred that the polymer matrix be positioned as the intermediate layer, and have an outer release layer positioned thereon. In this manner, the small molecules are able to diffuse through to the outer release layer to provide increased release.

A polymer matrix, as used herein, refers to the combination of polymer material and small molecules, wherein the small molecules are contained, embedded or dispersed within the polymer material. The small molecules are not, however, crosslinked with the polymer, but are encapsulated within the polymer material, thereby making up the polymer matrix.

In a preferred embodiment, the polymer of the polymer matrix is a functional or crosslinked polymer, and particularly preferred are functional silicone polymers such as crosslinked polydimethylsiloxane (PDMS) functional polymers. The functional silicone polymer may have terminal or pendant functionality. The crosslinked polymer backbone itself preferably has no residual functionality and does not take place in the crosslinking mechanism. Commercial examples of polydimethylsiloxane functional materials include RT 601 available from Wacker Chemie, and SYL-GARD® 182 and 186 from Dow Corning It is preferred that the PDMS have a hardness of from about 20 to about 70 Shore A, preferably from about 30 to about 60 Shore A, and particularly preferred from about 50 to about 55 Shore A.

In a preferred embodiment, the small molecules are non-functional. In another preferred embodiment, the small molecules are oligomers. Preferably, the small molecules have from about 1 to about 30 and preferably from about 3 to about 20 cyclic chains or repeating units. A cyclic chain, as used herein, refers to a molecular segment with repeating units in ring formation. Preferably, the small molecules have a molecular weight range of from about 100 to about 2,000, preferably from about 500 to about 1,250, and particularly preferred from about 500 to about 800.

The small molecules can be any materials capable of diffusing through the polymer to the surface of the polymer matrix. In a preferred embodiment, the small molecules are non-functional. Preferably, the small molecules comprise silicone oligomers, such as polydimethylsiloxane (PDMS) oligomers. Particularly preferred PDMS oligomers include straight chain molecules having from about 4 to about 100 units.

The small molecules are present in the polymer matrix in an amount of from about 5 to about 50, preferably from about 10 to about 25, and particularly preferred from about 15 to about 20 percent by weight of total solids. Total solids as used herein refer to the amount of solid material in the polymer matrix, including additives, fillers, the polymer, and like solids.

When the component film is subjected to heat and/or pressure, the small molecules ooze out of the polymer matrix and diffuse to the surface layer of the component film. The small molecules form a continuous film on the surface layer of the component film. A continuous layer refers to a layer that acts as an effective barrier for a surface with little and preferably no pinholes or voids that would allow contaminants or other physical elements from the system to achieve intimate contact with the surface. The exact methodology is unknown, although it is believed that the small molecules do not completely crosslink with the polymer in the polymer matrix. Instead, the non-functional small molecules are completely encapsulated within the crosslinked polymer bulk. Therefore, the small molecules are held loosely in the polymer matrix and do not crosslink with the polymer. Accordingly, heat and/or pressure can cause the small molecules to loosen from the polymer matrix and diffuse out. The small molecules essentially diffuse from the polymer bulk to the surface providing an internal release agent.

In a preferred embodiment, the polymer is functional and the small molecules are non-functional. It is theorized that in this embodiment, the non-functional small molecules are held loosely within the functional polymer of the polymer matrix. Again, upon associating the film component with heat and/or pressure, the small molecules will loosen and diffuse to the surface of the component film.

In the embodiment wherein the component film is used as a transfer or transfix member in an electrostatographic apparatus, the small molecules diffused to the surface of the component film can aid in release of the developed image from the transfer or transfix member. There is much improvement over known release agents or release fluids in terms of a decrease or elimination of contamination of the other components of the electrostatographic apparatus.

In known electrostatographic apparatuses that comprise transfer or transfix components, silicone fluids having functionality are used to enhance transfer or transfix. The functional silicone release agents can react with the copy substrates (e.g., paper) and can also react with the transfer or transfix members. In addition, the silicone release agents can be spread to other machine parts following contamination of the transfer or transfix member and/or the copy substrate. This can cause an accelerated component failure even after a few thousand prints.

In addition, many transfer or transfix members contain crosslinked silicone elastomers as outer layers. The crosslinked silicone layers contain functional groups to provide site for crosslinking that gives the polymers increased physical, properties such as toughness, hardness and tensile strength. Therefore, it is beneficial to provide an outer layer comprising a crosslinked silicone elastomer.

The present polymer matrix allows for a non-functional release agent to diffuse to the surface layer of the transfix or transfer member in order to aid in transfer of the developed image. Also, the polymer matrix layer of the transfer or transfix member in an embodiment of the invention, comprises a functional elastomer. This crosslinked elastomer supplies the transfer or transfix member with the desired physical properties of toughness, hardness and tensile strength. The combination of crosslinked elastomer outer layer and non-functional small molecules allows for a transfer or transfix member having the desired physical properties, along with superior release properties. Also, because the small molecule release agent does not contain functional groups, the small molecule release agent reduces or eliminates the possibility of contamination of the copy substrate and the transfer or transfix member.

Small molecules are added intentionally to slowly diffuse out under process conditions. The small molecules may also be a part of the polymer chain itself that can undergo degradation and be cleaved off to diffuse to the surface. In either situation, the function obtained is release.

The diffusion rate of the release fluid small molecules can be controlled by the crosslink density of the polymer portion of the polymer matrix, or by added absorbent mineral fillers. Crosslink density can be measured by equilibrium swell methods. Preferably, the crosslink density is from about $10^{-5}$ to about $10^{-3}$ moles of chains per cubic centimeter. This allows for a diffusion rate of the release agent from the small molecules of from about 0.1 to about 0.5, and preferably from about 0.2 to about 0.3 $\mu$l/copy substrate or print.

The component film, in embodiments, may comprise electrically conductive particles or mineral fillers dispersed therein, in addition to the small molecules. These electrical conductive particles decrease the material resistivity into the desired resistivity range. The desired surface resistivity is from about $10^6$ to about $10^{13}$, preferably from about $10^8$ to about $10^{12}$, and more preferably from about $10^{10}$ to about $10^{12}$ ohms/sq. The preferred volume resistivity range is from about $10^5$ to about $10^{14}$, preferably from about $10^8$ to about $10^{14}$, and particularly preferred is from about $10^{12}$ to about $10^{14}$ ohm-cm.

Varying the concentration of the conductive filler can provide the desired resistivity. It is important to have the resistivity within this desired range. The transfix components may exhibit undesirable effects if the resistivity is not within the required range. Other problems include resistivity that is susceptible to changes in temperature, relative humidity, and the like. The combination of silicone elastomer and electrically conductive filler, in embodiments, allows for tailoring of a desired resistivity, and further, allows for a stable resistivity virtually unaffected by changes in relative humidity and temperature.

Examples of suitable conductive fillers include carbon black such as fluorinated carbon black (for example ACCUFLUOR®), metal oxides such as iron oxide, aluminum oxide, antimony tin oxide, indium tin oxide, other metal oxides, metals, and the like. In a preferred embodiment of the invention, the electrically conductive filler is fluorinated carbon black. The optional conductive filler is present in the layer in an amount of from about 5 to about 40, preferably from about 10 to about 30, and particularly preferred from about 15 to about 20 percent by weight of total solids.

It is preferred that the outer layer of the transfix member be relatively thin Preferably, the thickness of the transfix member is from about 1 to about 10 mils, preferably from about 2 to about 8 mils, and particularly preferred from about 2 to about 4 mils.

The transfix substrate can comprise any material having suitable strength and flexibility for use as a transfix member, enabling the member to cycle around rollers during use of the machine. Preferred materials for the substrate include metals and fabrics. Examples of suitable metal materials include stainless steel (various grades), aluminum, and other like metals. Preferred metals include stainless steel and grades thereof.

A fabric material, as used herein, refers to a textile structure comprised of mechanically interlocked fibers or filaments, of polymers or metals, which may be woven or nonwoven. The fibers may be polymeric, metallic, synthetic, or natural fibers woven into a strong, dimensionally-stable backing substrate. Fabrics are materials made from fibers or threads that are woven, knitted or pressed into a cloth or felt type structure. Woven, as used herein, refers to closely oriented by warp and filler strands at right angles to each other. Nonwoven, as used herein, refers to randomly integrated fibers or filaments. The fabric material should have high mechanical strength and possess electrical insulating properties.

Examples of suitable fabrics include woven or nonwoven cotton fabric, graphite fabric, fiberglass, woven or nonwoven polyimide (for example KELVAR® available from DuPont), woven or nonwoven polyamide, such as nylon or polyphenylene isophthalamide (for example, NOMEX® of E.I. DuPont of Wilmington, Del.), polyester, aramids, polycarbonate, polyacryl, polystyrene, polyethylene, polypropylene, cellulose, polysulfone, polyxylene, polyacetal, and the like.

Preferably, the substrate is of a thickness of from about 25 to about 150 mils, preferably from about 25 to about 100 mils, and particularly preferred about 50 mils.

In an optional embodiment of a transfix member, an intermediate layer may be positioned between the substrate and the component film. Materials suitable for use in the intermediate layer include silicone materials, ethylene idiene propene monomers, isoprene, fluoroelastomers such as those sold under the tradename VITON®, urethanes, natural rubbers, and the like. Preferably, the intermediate layer comprises a silicone rubber, urethane or fluoroelastomer. In a particularly preferred embodiment, the intermediate layer further comprises a conductive filler. Suitable fillers include metals, metal oxides, carbon blacks, and the like.

It is preferred that the intermediate layer be conformable and be of a thickness of from about 5 to about 30 mils, preferably from about 10 to about 25 mils, and particularly preferred of from about 10 to about 20 mils.

Examples of suitable transfix members include a sheet, a film, a web, a foil, a strip, a coil, a cylinder, a drum, an endless strip, a circular disc, a belt including an endless belt, an endless seamed flexible belt, an endless seamless flexible belt, an endless belt having a puzzle cut seam, and the like. It is preferred that the substrate having the outer layer thereon, be an endless seamed flexible belt or seamed flexible belt, which may or may not include puzzle cut seams. Examples of such belts are described in U.S. Pat. Nos. 5,487,707; 5,514,436; and U.S. patent application Ser. No. 08/297,203 filed Aug. 29, 1994, the disclosures each of which are incorporated herein by reference in their entirety. A method for manufacturing reinforced seamless belts is set forth in U.S. Pat. No. 5,409,557, the disclosure of which is hereby incorporated by reference in its entirety.

The transfix film, preferably in the form of a belt, has a width, for example, of from about 150 to about 2,000 mm, preferably from about 250 to about 1,400 mm, and particularly preferred is from about 300 to about 500 mm. The circumference of the belt is preferably from about 75 to about 2,500 mm, more preferably from about 125 to about 2,100 mm, and particularly preferred from about 155 to about 550 mm.

In a transfix embodiment, heat may be supplied to the component film via known heating methods such as radiant heat, infrared heat, internal rollers or lamps, and other known heating sources.

Specific embodiments of the invention will now be described in detail. These examples are intended to be illustrative, and the invention is not limited to the materials, conditions, or process parameters set forth in these embodiments. All parts are percentages by weight of total solids as defined above unless otherwise indicated.

EXAMPLES

Example 1

A stainless steel or fabric substrate can be overcoated with an intermediate layer of a silicone elastomer, Wacker RT601® silicone elastomer loaded with about 20 percent by weight of a fluorinated carbon black (ACCUFLUOR® 2028, from Allied Signal, New Jersey) via flow coating or spray coating to a thickness of approximately 20 mil. The intermediate layer may also contain about, 40 percent by weight of a low molecular weight oligomer such as DMS-T00® (available from Gelest Inc., N.J.) contained in the polymer matrix. DMS-T00® is a short chain siloxane consisting of two siloxane repeat units. The low molecular weight oligomers are held by polymer-polymer affinity within the crosslinked network and it is understood that they will diffuse out over time in process. A formulation composed of Wacker. RT601® silicone elastomer loaded with about 20 percent by weight fluorinated carbon black (ACCUFLUOR® 2028) can be used as the final topcoat or outer release layer. The topcoat silicone layer can be coated to a thickness of approximately 3 mils as described previously.

The finished belt can then be used in a transfix fixture, exhibiting enhanced release as a result of possessing a quantity of a diffusable release agent within the intermediate polymer matrix layer.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A transfix member comprising:
   a) a substrate, and thereover
   b) a component film having a surface layer and a polymer matrix layer comprising a polymer and small molecules, said polymer matrix layer designed to allow said small molecules to diffuse through said polymer matrix layer to said surface layer to form a continuous film on said surface layer upon the application of pressure or heat to said component film, and
   c) a heating component associated with said substrate.

2. The transfix member of claim 1, wherein said small molecules diffuse through said polymer matrix layer to form a continuous layer on said surface layer.

3. The transfix member of claim 1, wherein said polymer is a functional polymer.

4. The transfix member of claim 1, wherein said polymer is crosslinked.

5. The transfix member of claim 1, wherein said polymer is a silicone polymer.

6. The transfix member of claim 5, wherein said silicone polymer is a polydimethylsiloxane polymer.

7. The transfix member of claim 1, wherein said small molecules comprise non-functional oligomers.

8. The transfix member of claim 1, wherein said small molecules comprise oligomers having from about 1 to about 30 cyclic units.

9. The transfix member of claim 8, wherein said oligomers have from about 3 to about 20 cyclic units.

10. The transfix member of claim 1, wherein said small molecules are completely encapsulated within said polymer matrix.

11. The transfix member of claim 1, wherein said polymer matrix layer further comprises a conductive filler.

12. The transfix member of claim 11, wherein said conductive filler is selected from the group consisting of metal oxides and carbon black.

13. The transfix member of claim 11, wherein said conductive filler is selected from the group consisting of aluminum oxide, iron oxide, antimony tin oxide, indium tin oxide, and fluorinated carbon.

14. The transfix member of claim 1, wherein said substrate comprises a material selected from the group consisting of fabrics and metals.

15. The transfix member of claim 14, wherein said fabric material is selected from the group consisting of cotton fabric, graphite fabric, fiberglass, polyimide, polyamide, polyester, aramids, polycarbonate, polyacryl, polystyrene, polyethylene, polypropylene, cellulose, polysulfone, polyxylene, and polyacetal.

16. The transfix member of claim 1, wherein said small molecules have a crosslink density of from about $10^{-5}$ to about $10^{-3}$ moles of chains per cubic centimeter.

17. A transfix member comprising:
   a) a substrate, and thereover
   b) a component film having a surface layer, said component film comprising a polymer matrix layer comprising a polymer and small molecules, said polymer matrix layer designed to allow said small molecules to diffuse through said polymer matrix layer to said surface layer to form a continuous film on said surface layer upon the application of pressure or heat to said component film, wherein said polymer is a functional silicone material and said small molecules comprise non-functional silicone oligomers, and
   c) a heating component associated with said substrate.

* * * * *